US012292150B2

(12) United States Patent
Kroczek et al.

(10) Patent No.: US 12,292,150 B2
(45) Date of Patent: May 6, 2025

(54) WATER PORT CLOSURE ASSEMBLY (71) Applicant: Goodrich Corporation, Charlotte, NC (US)

(72) Inventors: Piotr Kroczek, Nieciszów (PL); Dariusz Homa, Gliwice (PL); Monika Kotwica, Bolesławice (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/192,749

(22) Filed: Mar. 30, 2023

(65) Prior Publication Data
US 2023/0323994 A1  Oct. 12, 2023

(30) Foreign Application Priority Data
Apr. 6, 2022  (EP) ................................ 22461535

(51) Int. Cl.
F16L 55/10 (2006.01)
F16K 1/24 (2006.01)
F16K 27/12 (2006.01)
F16L 55/115 (2006.01)

(52) U.S. Cl.
CPC .......... *F16L 55/1018* (2013.01); *F16K 1/24* (2013.01); *F16K 27/12* (2013.01); *F16L 55/115* (2013.01); *F16L 55/1157* (2013.01)

(58) Field of Classification Search
CPC .. F16L 55/1018; F16L 55/115; F16L 55/1157; F16K 1/24; F16K 27/12
USPC ................... 220/810–815; 137/800
See application file for complete search history.

(56) References Cited

U.S. PATENT DOCUMENTS

| 131,748 A | 10/1872 | Fowler |
| 1,035,841 A * | 8/1912 | Anderson ............ F01P 11/0214 220/322 |
| 1,199,596 A * | 9/1916 | Noll ..................... B65D 43/162 220/315 |
| 2,522,964 A * | 9/1950 | Rowe ....................... H02B 1/38 220/849 |
| 3,812,998 A | 5/1974 | Amrogowicz |
| 4,127,215 A | 11/1978 | Morrison |

(Continued)

FOREIGN PATENT DOCUMENTS

| CN | 213949309 U | 8/2021 |
| JP | H10218212 A | 8/1998 |

OTHER PUBLICATIONS

Abstract for CN213949309 (U), Published: Aug. 13, 2021, 1 page.

(Continued)

*Primary Examiner* — John Bastianelli
(74) *Attorney, Agent, or Firm* — CANTOR COLBURN LLP (57) ABSTRACT A closure assembly for a fluid port having a fluid flow channel defined along an axis, the channel ending in a port opening. The assembly includes: a closure cap extending in a first plane arranged to seat across, and close the port opening, in use, in a closed state, a guide arm extending from the cap in a second plane substantially perpendicular to the first plane; a lifting guide to accommodate and retain the guide arm for movement of the guide arm in the second plane as the cap moves axially away from the opening; and a pivot mechanism between the guide arm and the lifting guide about which the cap is able to pivot relative to the lifting guide to an open position.

13 Claims, 9 Drawing Sheets (56) References Cited

U.S. PATENT DOCUMENTS

| | | | |
|---|---|---|---|
| 5,197,515 A | 3/1993 | Saville et al. | |
| 6,719,344 B2 * | 4/2004 | Ono | B60R 7/04 |
| | | | 297/188.17 |
| 6,776,183 B1 | 8/2004 | Brooker et al. | |
| 2005/0166983 A1 | 8/2005 | Shaw et al. | |
| 2011/0275422 A1 * | 11/2011 | Kemppinen | H04M 1/0237 |
| | | | 361/679.01 |
| 2011/0309097 A1 * | 12/2011 | Heilman | B65D 47/0871 |
| | | | 220/326 |

OTHER PUBLICATIONS

Abstract of JPH10218212 (A): Published: Aug. 18, 1998, 1 page.
European Search Report for Application No. 22461535.1, mailed Oct. 10, 2022, 7 pages.

* cited by examiner

WATER PORT CLOSURE ASSEMBLY

CROSS-REFERENCE TO RELATED APPLICATIONS

This application claims priority to European Patent Application No. 22461535.1 filed Apr. 6, 2022, the entire contents of which is incorporated herein by reference.

TECHNICAL FIELD

The present disclosure is concerned with providing a closure assembly for ports in a water system, such as the fill and overflow ports of a water system. The water system can, for example, be a system for providing potable or fresh water in an aircraft.

BACKGROUND

Water systems often include a tank or storage vessel to store water which can then be plumbed to other parts of the system to provide water to different parts of the system from the storage tank/vessel. The tank will need to be periodically re-filled. Typically, the tank is provided with a fill port to which a fill line, connected to a source of water, is connected for re-filling the tank from the source. The tank may also be provided with an overflow or overfill line via which water can exit the tank if the tank is overfilled. The overflow water exits from an overflow port on the tank. During the tank filling process, the fill port, and, where present, the overflow port, will be open. In some applications, the ports are left open after filling, or are provided with a valve mechanism that is only opened when the fill line/overflow line is attached. The ports may be provided in an operating panel that is covered by a door or panel when not in use. In certain environments, e.g. where the tank is subjected to movement or vibration or in environments where debris or contaminants exits which should not be allowed to get into the tank, a closure or cap assembly is provided at the ports to close the port(s) when not being filled. In an arrangement with a fill port and an overflow port, each port may be provided with its own cap or closure or, alternatively, a single closure can be provided that covers both ports, when closed. Such assemblies may be used, for example, in aircraft. An aircraft typically has water stations in the cabin for dispensing drinking water during flight. The aircraft has a storage tank filled with potable water and plumbing to provide water from the tank to the stations as required. The tank is re-filled between flights by ground crew, by connecting an external source of water, e.g. a water truck, to the tank via a hose connected to the fill line attached to the fill port.

Whilst existing closure arrangements are effective in closing the ports, they are typically hinged relative to the ports in such a way that they require a large area around the ports to allow them to open and close. In environments where space is limited e.g. in aircraft, this is undesirable and there is a need for an improved port closure assembly that provides effective closure but also allows the closure to be opened and closed within a limited space.

SUMMARY

According to the disclosure, there is provided a closure assembly for a fluid port having a fluid flow channel defined along an axis, the channel ending in a port opening, the closure assembly comprising: a closure cap extending in a first plane arranged to seat across, and close the port opening, in use, in a closed state, a guide arm extending from the cap in a second plane substantially perpendicular to the first plane; a lifting guide to accommodate and retain the guide arm for movement of the guide arm in the second plane as the cap moves axially away from the opening; and a pivot mechanism between the guide arm and the lifting guide about which the cap is able to pivot relative to the lifting guide to an open position.

The assembly may further comprise a stop mechanism to limit movement of the guide arm in the second plane in the lifting guide.

The lifting guide may include a slot therein, wherein the stop mechanism comprises a pin extending from the guide arm through the slot, such that the axial movement of the guide arm in the receptacle is limited by the pin abutting against an end of the slot. The pin and the slot may also define the pivot mechanism, such that when the pin abuts against the end of the slot, the guide arm can be pivoted relative to the lifting guide.

In an example, the lifting guide has openings formed therein, and the guide arm comprises two resilient arm portions, wherein, in the closed position, the guide arm is located in the lifting guide such that the resilient arms protrude and secure against edges of the openings in the lifting guide to secure the guide arm in the lifting guide in the closed position. The guide arm may be configured to be released from being secured in the lifting guide in the closed position by application of a pressing force on the resilient arms through the openings of the lifting guide, to allow the guide arm to move axially within the lifting guide.

Also provided is a port assembly comprising a fluid port having a fluid flow channel defined along an axis and fluid opening at an end of the fluid flow channel, and a closure assembly as defined above and arranged such that the closure cap closes the opening in the closed position.

In one example, the port assembly comprises a first fluid port having a first fluid flow channel defined along a first axis with a first fluid opening at an end of the first fluid flow channel, and a second fluid port having a second fluid flow channel defined along a second axis, parallel to the first axis, with a second fluid opening at an end of the second fluid flow channel, the assembly comprising a respective closure assembly for each of the first fluid port and the second fluid port.

In the open position of each closure assembly, the respective closure caps are preferably located in an area between the first fluid port and the second fluid port, and may be secured in the open position e.g. by magnets or the like.

BRIEF DESCRIPTION OF THE DRAWINGS

Examples of the assembly according to this disclosure will be described by way of example only and with reference to the drawings. It should be noted that variations are possible within the scope of the claims.

DETAILED DESCRIPTION

By way of background, an example of a known port closure assembly will first be described, with reference to FIGS. 1 to 4.

Figure 1:
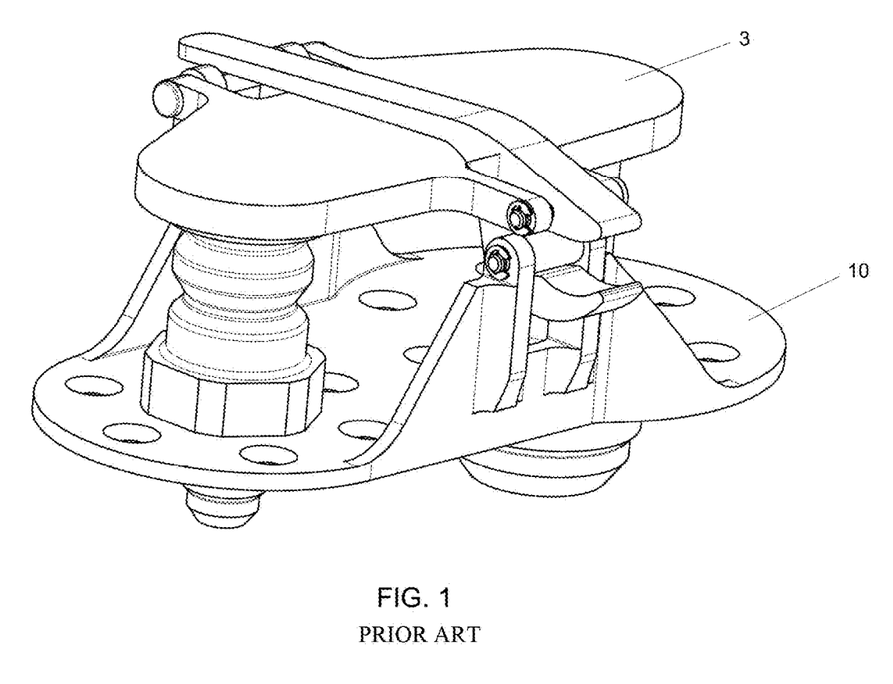
FIG. 1 is a perspective view of an example of a known closure assembly for a fill port and an overflow port of a water system.
Figure 2:
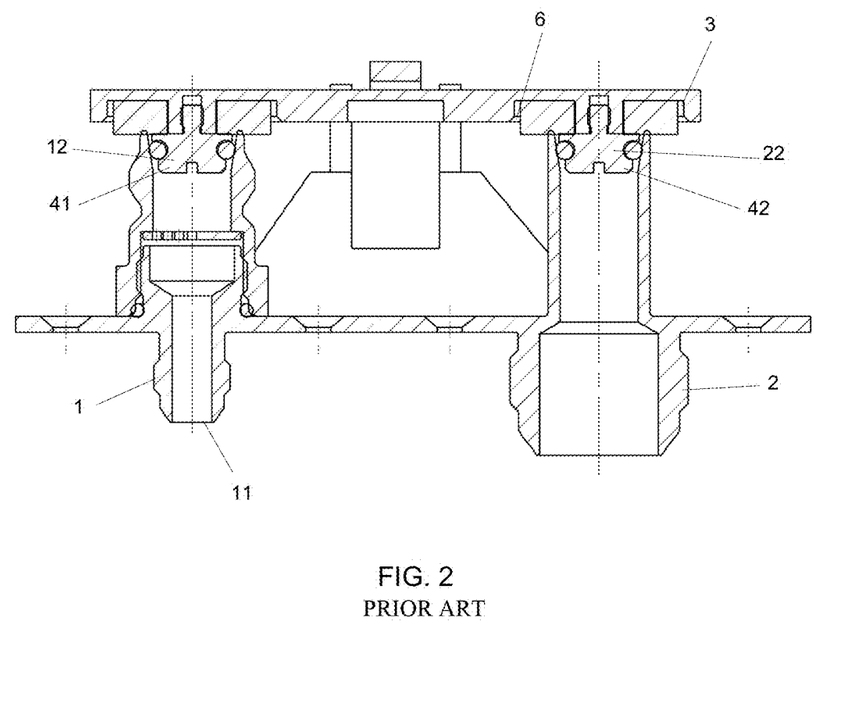
FIG. 2 is a side sectional view of an assembly as shown in FIG. 1.

In this assembly, a fill port 1 and an overflow port 2 are provided in a housing 10. These will be in fluid connection at a first end 11, 21 with the storage tank or other vessel to be filled via the fill port. The second end 12 of the fill port 1 is provided with a respective fitting 31 configured to be fluidly connected to a fill line (not shown) when the tank is being filled. The second end 22 of the overflow port 2 is provided with a fitting 32 configured to be fluidly connected to an overflow line (not shown). A cap 3 is provided to cover the second ends 12, 22 of the fill and overflow ports in the closed state. In the example shown, a single cap is provided that covers both ports 1, 2 as this simplifies the closing operation by the user and reduces the risk of a port being inadvertently left open after filling. Other known assemblies have a separate cap for each port.

The cap 3 is mounted to the assembly housing 10 by a hinge arrangement 4 adjacent the second ends of the ports, and is provided with a lever and latch mechanism 5 to open and close the cap 3. The inner surface of the cap, that comes into contact with the second end of the port(s) when closed, is preferably provided with a seal 6. An additional seal, such as an O-ring seal 7, may also be provided around the second end of the port(s). The inner surface of the cap may be formed with respective plugs or protrusions 41, 42 arranged to fit into the port fittings when the cap is closed.

In the example, the latch and lever mechanism includes a lever 15 having a lever body 151, a lever end 152 and a latch end 153. When the cap 3 is in the closed position, the lever body 151 lies across the outer surface of the cap, essentially flat against the cap, with the lever end 152 adjacent the hinge 4. The latch end 153 includes a catch or claw 154 that secures in a recess or detent 155 on the side of the housing opposite the hinge 4. The closed position is shown in FIG. 3A.

Figure 3A:
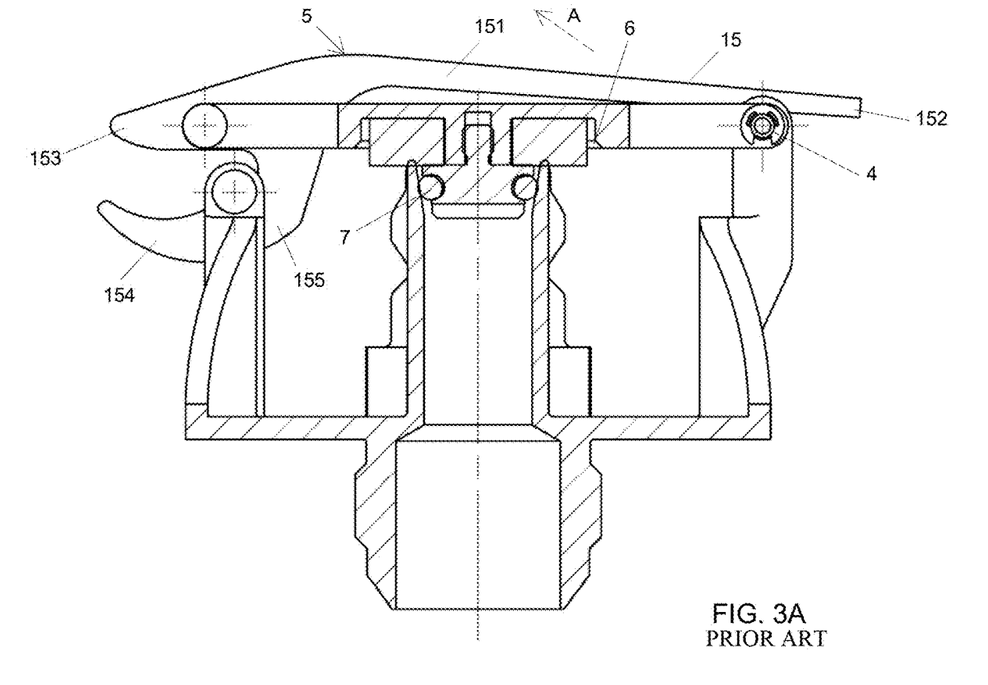
FIGS. 3A and 3B illustrate how an assembly such as that shown in FIGS. 1 and 2 is opened.
Figure 3B:
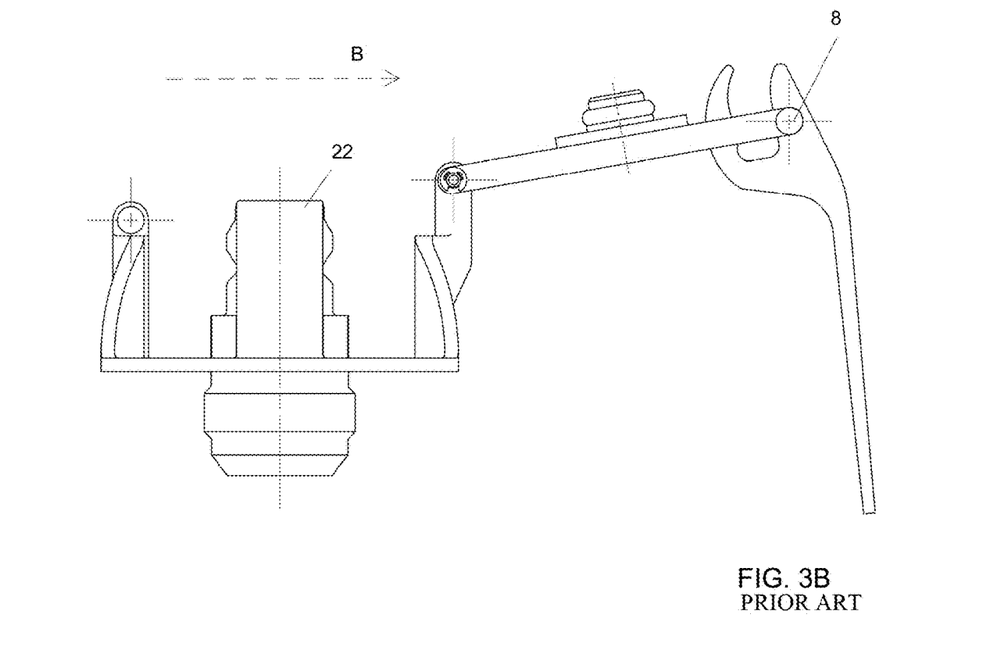
Figure 4A:
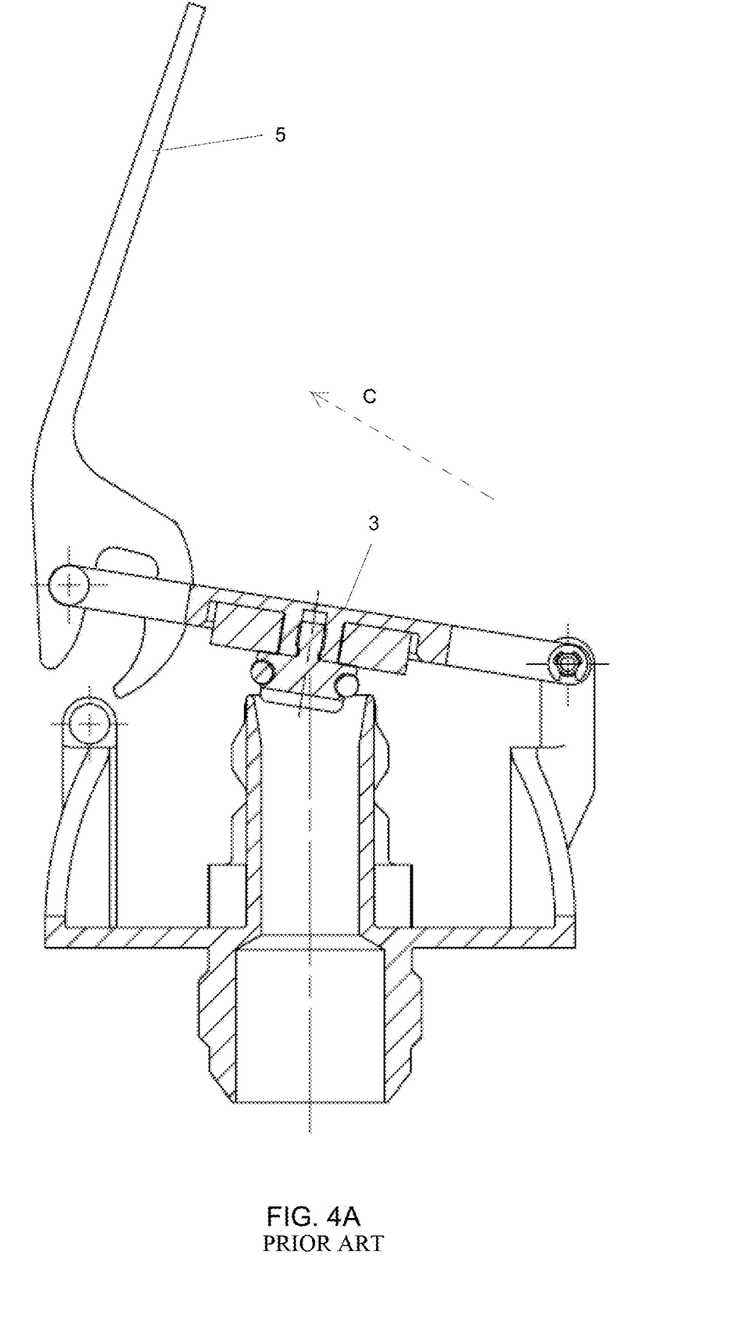
FIGS. 4A and 4B illustrate how an assembly such as that shown in FIGS. 1 and 2 is closed.
Figure 4B:
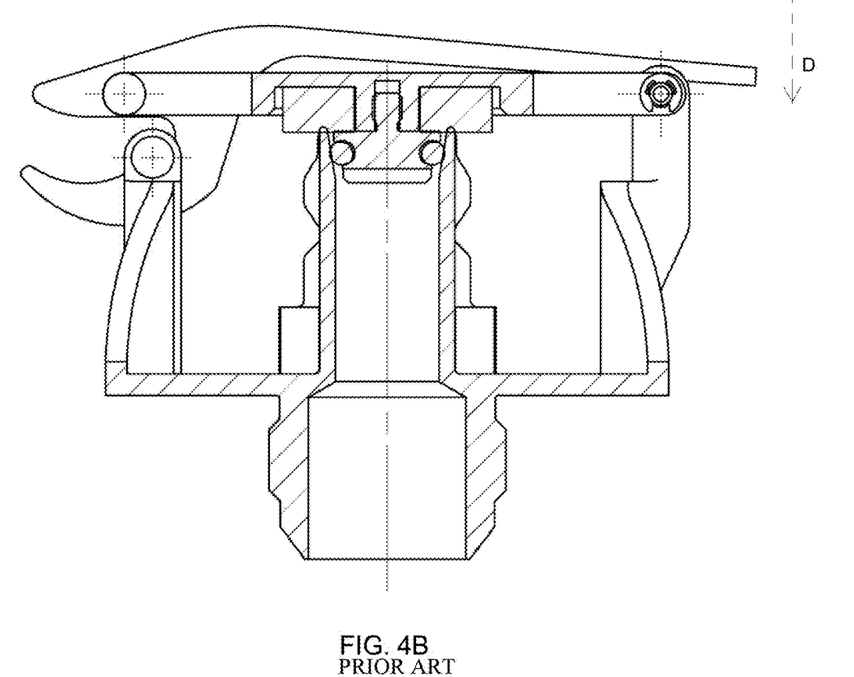
Figure 5:
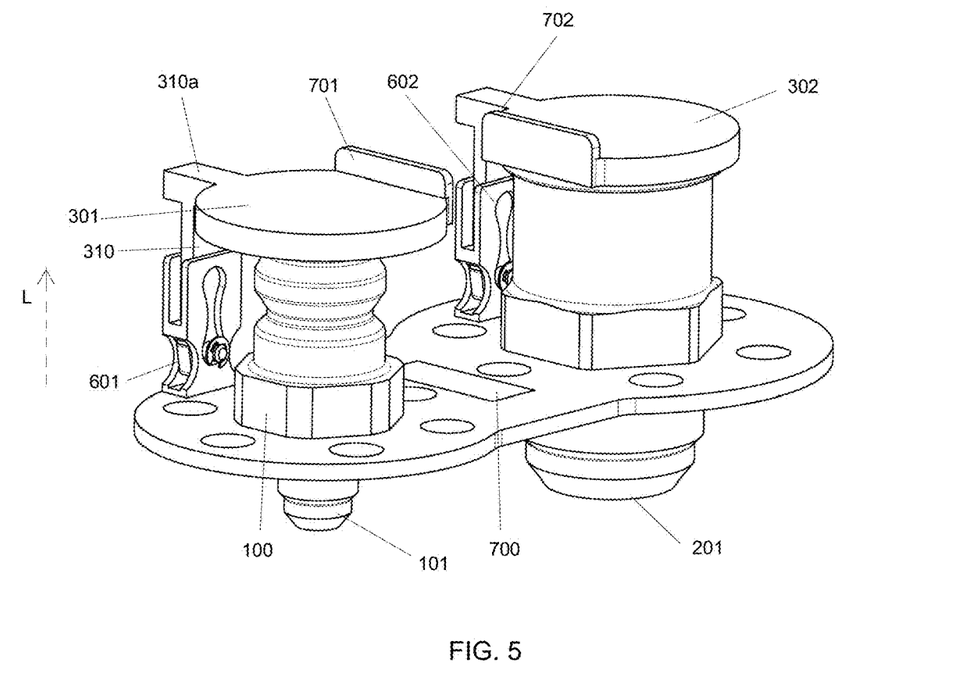
FIG. 5 is a perspective view of an example of a closure assembly for a fill port and an overflow port of a water system, according to this disclosure.
Figure 6:
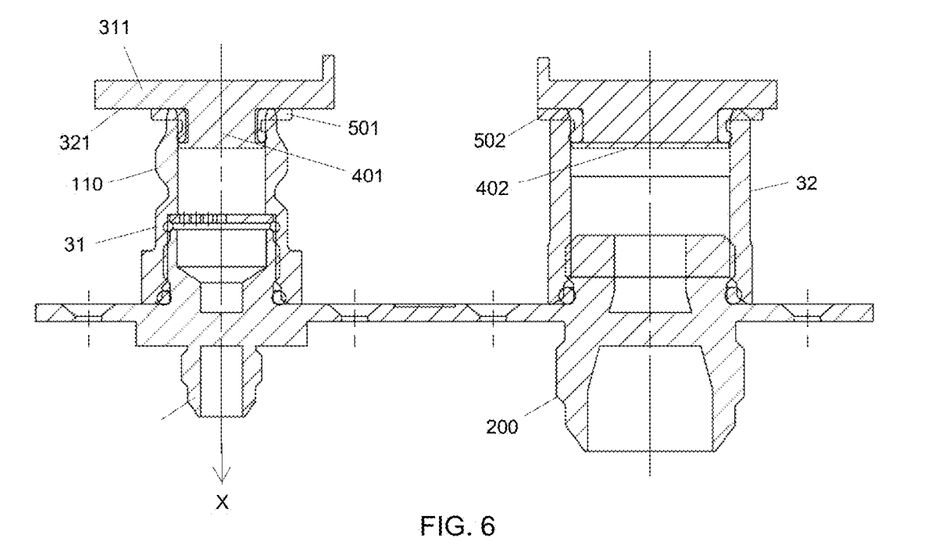
FIG. 6 is a side sectional view of an assembly as shown in FIG. 5.

To open the cap 3, the lever end 152 first needs to be lifted away from the cap, in the direction of arrow A in FIG. 3A to cause the latch end 153 to move the claw 154 out of engagement with the detent 155. The lever 5 is then moved in an arc movement (arrow B in FIG. 3B) about the hinge 4. At the latch end of the lever is attached to the cap 3 (e.g. by a pin 8), the movement of the latch causes corresponding movement of the cap 3 about the hinge 4 to move the cap 3 out of engagement with the second end of the port(s) (FIG. 3B). In an example, not shown, where each port has its own cap, the opening motion would be similar for each cap 3.

To close the cap 3, the lever 5 is then moved in an arc relative to the housing (arrow C in FIG. 4A) opposite to the opening direction B, moving the lever and the cap about the hinge 4 to close over the port and to bring the latch end 154 into engagement with the detent 155. The lever is then brought down (arrow D) towards the outer surface of the cap 3 to the original position, essentially flat against the cap 3 (FIG. 4B) and the latch end locks behind the detent.

As can be seen from FIGS. 3A, 3B, 4A and 4B, the arcuate motion of the lever and the cap defines a large range of movement relative to the size of the overall assembly and would require a large area above the ports to allow the cap to be opened and closed.

Another problem that has been observed with such assemblies, is that due to the hinge arrangement between the cap and the port, the seals on the inner surface of the cap and/or between the cap and the port or fitting suffer from unequal loading during opening and closing of the caps. The parts of the seal closer to the hinge will become pinched and suffer excess loading compared to the seal parts further away from the hinge. Also, because of the rotational motion in bringing the cap into position on the port, there is a risk that the cap parts will not immediately locate in the correct central position, and can press on the seals. This can cause uneven wear on the seals and adversely affect their proper functioning.

The present disclosure provides an improved closure assembly that requires less space to open and close the cap(s). The assembly can also address the problem of uneven wear on the seals. An example will be described with reference to FIGS. 5 to 11.

As shown in FIGS. 1 and 2, the closure assembly is provided for a fill port 100 and an overflow port 200 provided in a housing 10'. As in the example described above, the first end 101 of the fill port and the first end 201 of the overflow are configured to fluidly connect to the storage tank. The fittings 110 and 210 are configured to, respectively, fluidly connect to the fill line and the overflow line (not shown) during filling. The closure assembly of this disclosure is, however, different to the known assembly described above.

Whilst the following description is of an example having two ports and each having a respective cap, the same principles could apply for a cap or closure for only a single port.

Each cap 301, 302 is arranged to fit over its respective port 100, 200 at the second end of the port, to sealingly mate with the respective fitting 31, 32, when closed. As with the example above, the caps may be provided with plugs 401, 402 for location within the fittings and seals 501, 502 may be provided between the caps and the fittings to prevent leakage when closed.

Each cap 301,302 (or the cap, where there is only a single cap and/or a single port) is connected to the housing 10' via a cap lifting guide 601, 602 as will be described further below, to guide the cap in a lifting direction L relative to the port and to allow the cap to pivot relative to the port, again as described further below. A securing feature may be provided to secure the cap in the open position relative to the housing 10'. In the example shown, the securing feature may be in the form of a pair of magnetic elements 700; —701, 702—one on the cap and one on the housing—to magnetically hold the cap to the housing when the cap is open. Other means for holding or securing the cap in the open position can also be envisaged such as latches, hooks, detents or the like.

The main feature of the present assembly that distinguishes over the know assemblies is that the caps are configured to open by first being raised, relative to the port, in a direction essentially along the axis between the first and second ends of the port, and then being pivoted relative to the port to locate at the side of the port. Where the assembly includes two caps for two adjacent ports, the caps can be lifted and then pivoted into the region between the two ports and, if required, the open caps can be secured in place.

The opening and closing according to the disclosure will now be described in more detail with particular reference to FIGS. 8 to 11.

To assist with describing the opening and closing, directions will be described relative to the axis X of the port from its first end to its second end.

The port is mounted relative to the housing 10' such that the axis X passes through from one side of the housing to the other. The first end of the port extends axially from one side of the housing. The second end of the port around which the fitting is provided extends axially from the other side of the housing. Mounted to the housing is the lifting guide 601 also extending axially from the housing, adjacent the port. The lifting guide 601 is shaped to receive a guide arm 310 of the cap 301.

The cap 301 includes a closure part 311 which is shaped to sit over and close the port on which it is fitted. As mentioned above, the cap may be provided with a plug portion that fits into the port fitting, and seals may also be provided to prevent leakage from the port when the cap is closed. In the examples shown, the closure port has an essentially circular cross-section, but other shapes are possible. To simplify the manual lifting of the cap, the closure member may be sized to extend radially beyond the radius of the port and fitting so provide a lip 321 that the user can easily grip. This is not, however, essential and the cap could have the same diameter as the fitting or the port end. The guide arm 310 extends in an essentially L-shaped from the closure part thus defining a radial arm portion 310a extending radially away from the closure part 311, and an axial arm portion 310b extending axially from the radial portion to engage in the lifting guide 601. The lifting guide 601 is in the form of a receptacle shaped to receive the axial arm portion of the cap such that the axial arm portion is able to move axially relative to the lifting guide. A stop feature 312 e.g. in the form of a pin 312 that extends through and cam move axially within a slot 314 in the lifting guide, defines the limit of axial movement of the axial arm portion relative to the lifting guide and the of axial movement of the cap relative to the port. The stop feature 312 is formed at the end of the axial arm portion, opposite the end where the axial arm portion extends from the radial arm portion, so that when the stop feature stops axial movement of the axial arm portion in the lifting guide (e.g. by the pin abutting against the boundary of the slot), the axial arm portion is clear of the receptacle and is able to pivot relative to the lifting guide and, therefore, the cap can pivot relative to the port.

Figure 7:
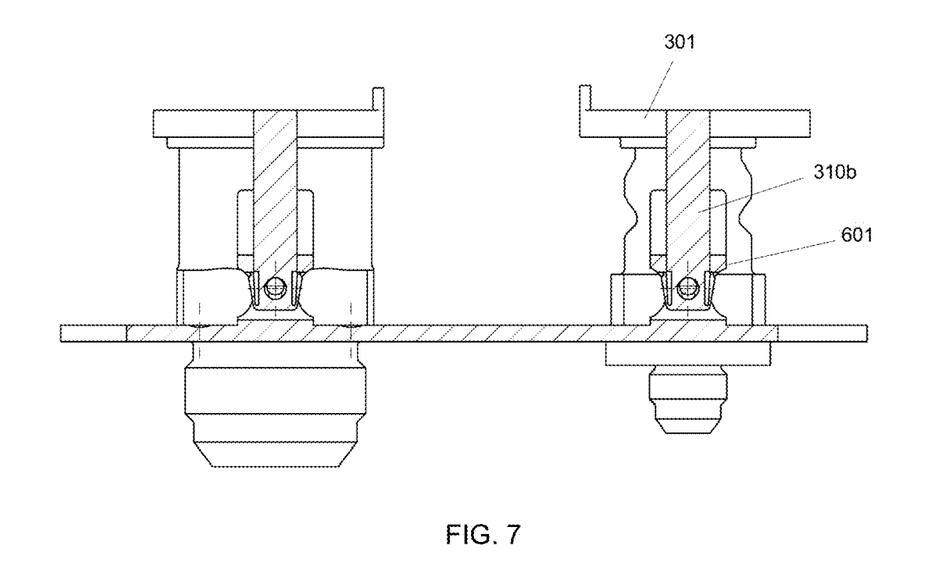
FIG. 7 shows a side view of the assembly in a closed position.

This movement can be seen in, and best described with reference to FIGS. 7 to 10. Only the fill port mechanism will be described in detail, but it will be appreciated that the cap for the overflow port will operate in the same way FIG. 7 shows the cap 301 in the closed position, located over the first end of the port 100. In this position, the axial arm portion 310b of the guide arm 310 is located in the receptacle defined by the lifting guide 601. (FIG. 7).

Figure 8:
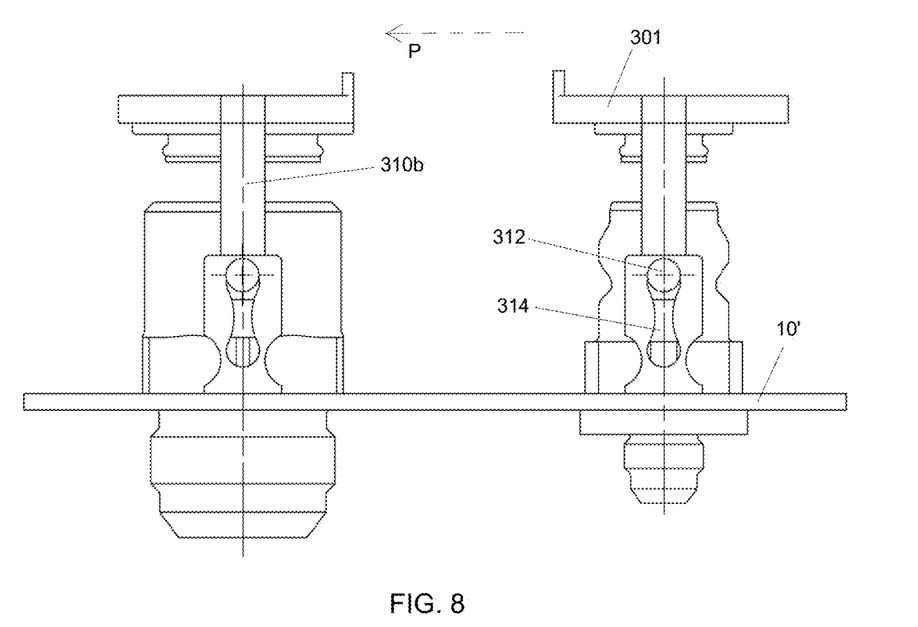
FIG. 8 shows the assembly of FIG. 7 at a first stage of opening.
Figure 9:
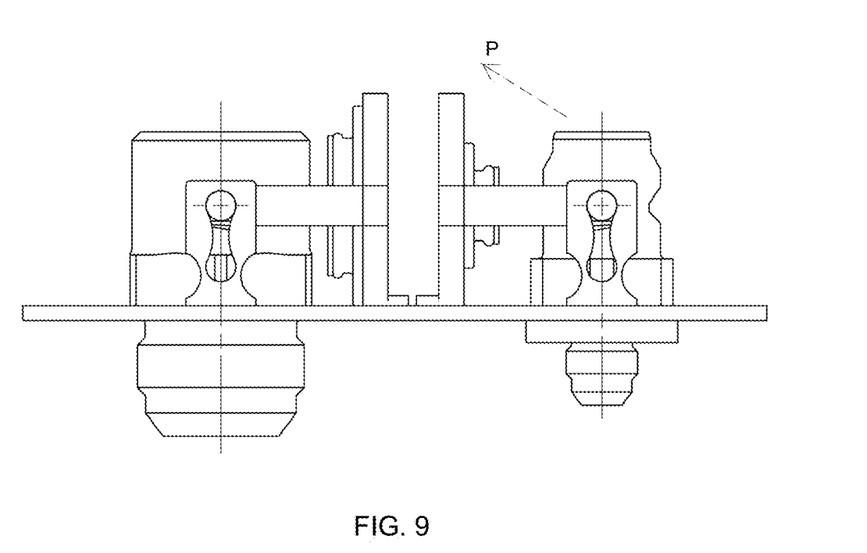
FIG. 9 shows the assembly of FIGS. 7 and 8 in the open position.

To open the cap, the cap is lifted axially (direction L) away from the port, the axial arm portion being guided axially within the lifting guide receptacle. The extent of axial movement of the cap 301 is defined by the stop feature 312. Here, as seen in FIG. 8, this is a pin extending from the end of the axial arm portion through a slot 314 in the lifting guide. When the pin reaches the top of the slot, the cap cannot be lifted further in the axial direction. At this stage, that cap is then pivoted about a pivot point defined by the stop feature 312 (direction P) relative to the port to a fully open position as shown in FIG. 9.

As mentioned above, if another port is provided with another cap, such as the overflow port shown in these examples, that cap may be opened in the same way. Whilst the cap could be pivoted relative to the port in either the direction shown by arrow P or the opposite direction, a more compact solution is provided if the caps are pivoted, in the case of two adjacent ports, to both end up in the middle space defined between the two ports.

Whilst the weight of the caps may be sufficient to keep them in the open position until manually closed, it may be desirable to fix the caps in the open position by some form of securing feature. In the example shown, a magnet 700 may be provided on the housing 10' at the location where the caps will come to rest in the open position. The caps are provided with a magnetic portion 701, 702 that magnetically attaches to the magnet with a force that ensures the caps will be secured in the open position even when subjected to normal fluctuations or movements expected in the environment, but that the magnetic attraction can be overcome by manual force to close the cap(s).

The structure of the guide arm 310 and the lifting guide 610 can vary according to design preferences and requirements, provided the guide arm is able to move axially in a guided manner relative to the lifting guide and then to be pivoted relative thereto.

Figure 7A:
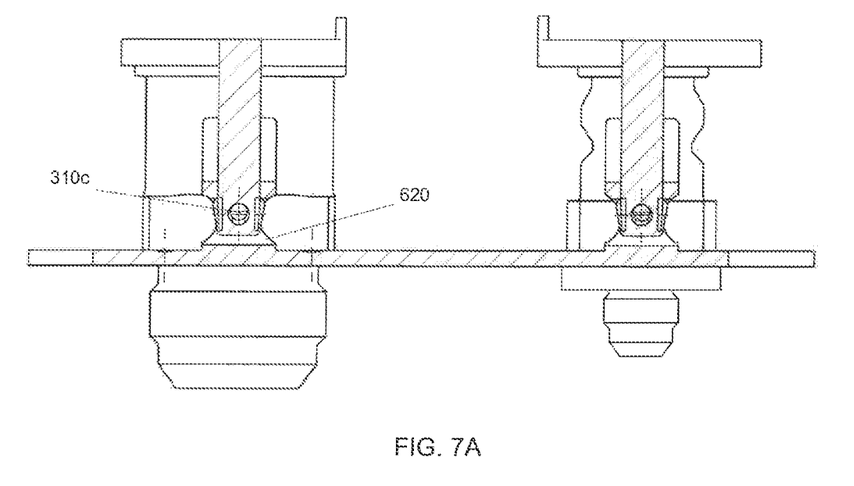
FIG. 7A illustrates in more detail a feature of the assembly for securing in/releasing from the closed position.
Figure 7B:
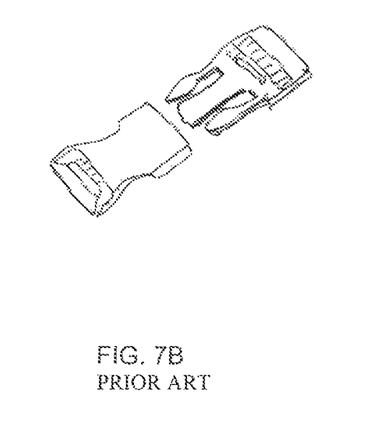
FIG. 7B is a known snap-fastening buckle used for explanation.

One example of the guide arm/lifting guide structure is shown in more detail in FIG. 7A. In this example, the guide arm and lifting guide are shaped and configured such that in the closed position, the guide arm is biased to be locked against axial movement and a pressing action is required by the user to release the guide arm for axial movement within the lifting guide. In the example shown, this is achieved by forming the guide arm to have resilient sides or resilient side arms 310c that are based relatively outwards. The lifting guide defines, as mentioned above, a receptacle. The dimension of the receptacle is less than that of the resilient sides or side arms when they are biased outwards. Towards the lower part of the receptacle in the cap closing direction of axial movement of the guide arm in the receptacle, openings 620 are formed in the walls of the lifting guide. As the guide arm travels axially down the receptacle from the open to the closed position, the walls of the lifting guide act against the bias of the sides/arms to expand outwards but at the point when those sides/arms reach the openings 620, there is no resistance to them expanding and the arms expand out through the openings. This provides a latching effect and means that the guide arm cannot be moved back in the opening direction unless a user physical presses the resilient sides/arms 310c inwards, at the openings 620, to decrease the dimension of the guide arm to enable it to be moved axially within the walls of the lifting guide. The structure is similar to a known snap-fit buckle such as shown in FIG. 7B. This provides an additional safety feature that can be provided to prevent inadvertent opening of the cap e.g. due to movements/vibrations in the environment.

Figure 10:
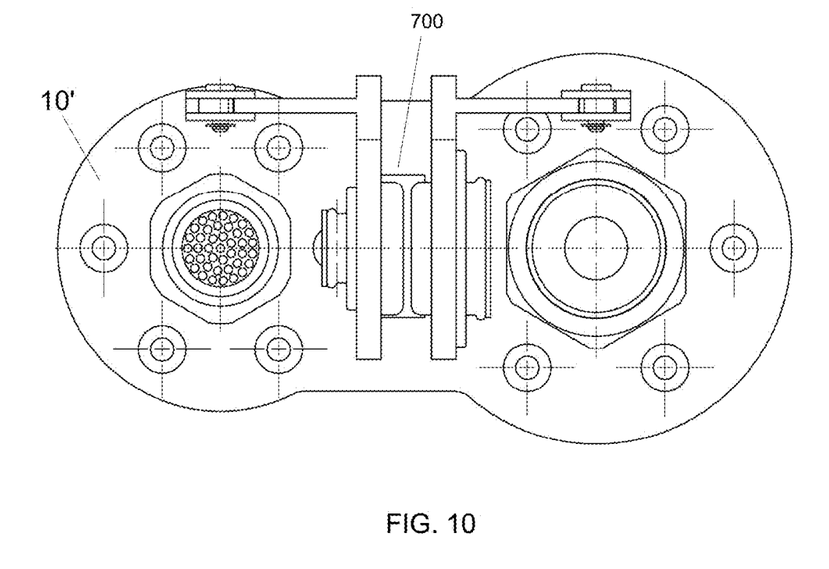
FIG. 10 is a top view of the assembly in the open position.

To close the cap again, from the open position such as shown in FIGS. 9 and 10, the cap is released by a manual force, from the holding force of the securing feature (if present) and then first pivoted to a position axially above the port (i.e. back to the position shown in FIG. 8, and is then pushed axially downwards until the cap is seated in position over the port. If the additional safety feature described in relation to FIG. 7 is present, the resilient sides/arms will expand outwards when they reach the openings, to snap into the locked position.

Because the closing movement of the cap is axial, or vertical, relative to the port, the cap will be centrally location and there is no pinching of the seals at a hinge part, or the problem of a portion of the seal first meeting the edge of the fitting or the port before coming to its correct position relative to the fitting/port as in the known assemblies.

Figure 11A:
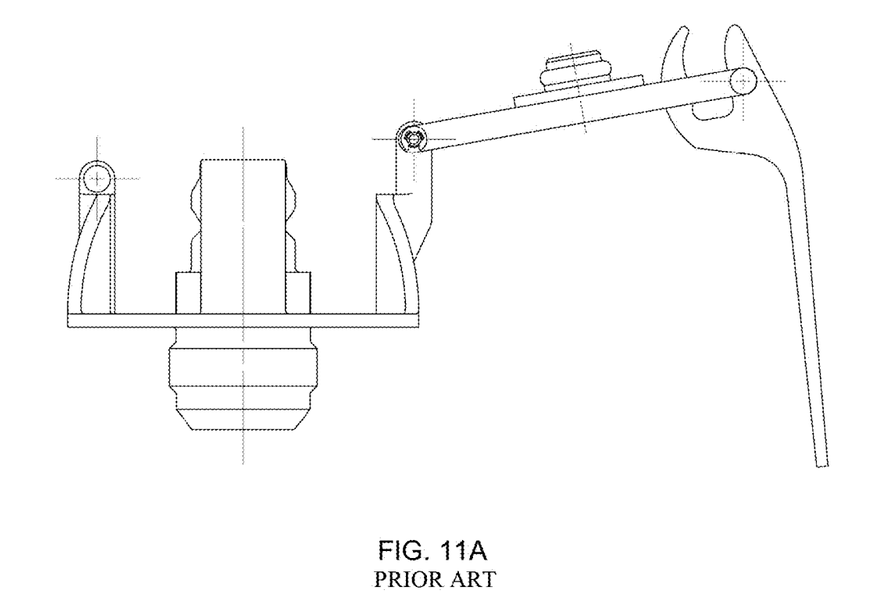
FIGS. 11A and 11B are illustrated to compare a typical assembly such as shown in FIG. 1, when open, to an assembly according to this disclosure, when open.
Figure 11B:
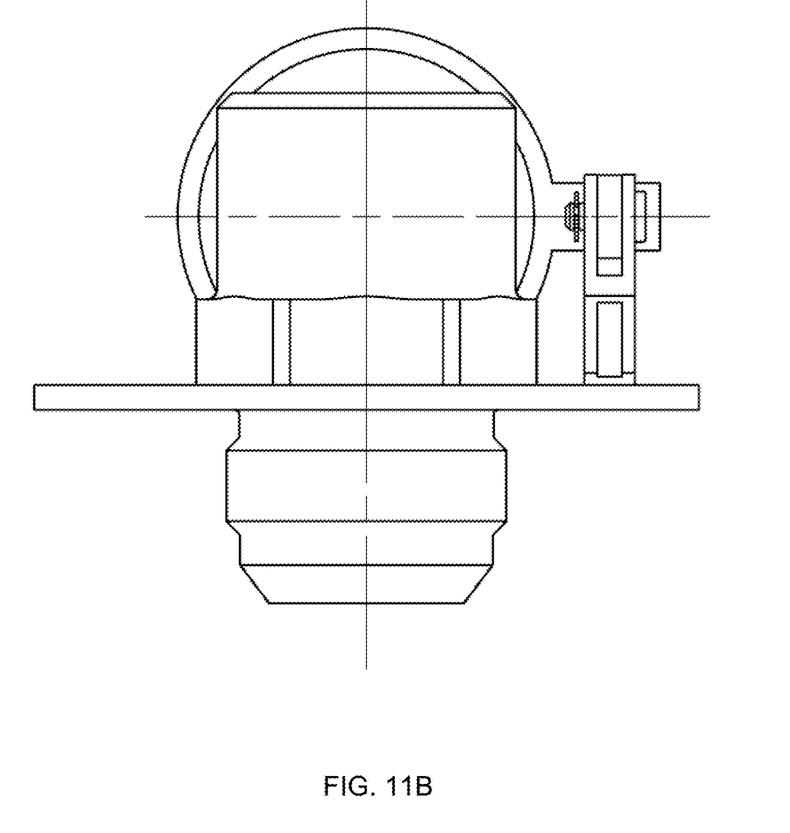

Further, because of the different motion required to open and close the caps according to this disclosure, and as can be seen by comparing FIGS. 11A and 11B, the assembly of this disclosure requires much less space to open and close the caps and is, therefore, better suited to applications where space or access is limited or restricted.

In addition, the overall size, mass and complexity of the assembly of this disclosure is less than that of known assemblies. A reduction in mass, number of parts and manufacturing costs and complexity is important in many fields including the aircraft industry.

The invention claimed is:

1. A closure assembly for a fluid port having a fluid flow channel defined along an axis, the channel ending in a port opening, the closure assembly comprising:
    a closure cap extending in a first plane arranged to seat across, and close the port opening, in use, in a closed state,
    a guide arm extending from the cap in a second plane substantially perpendicular to the first plane;
    a lifting guide to accommodate and retain the guide arm for movement of the guide arm in the second plane as the cap moves axially away from the opening; and
    a pivot mechanism between the guide arm and the lifting guide about which the cap is able to pivot relative to the lifting guide to an open position;
    wherein the lifting guide defines a receptacle to receive the guide arm such that the guide arm can move in and axially relative to the lifting guide.

2. The assembly of claim 1, further comprising:
    a stop mechanism to limit movement of the guide arm in the second plane in the lifting guide.

3. The assembly of claim 1, wherein the lifting guide includes a slot therein, and wherein the stop mechanism comprises a pin extending from the guide arm through the slot, such that the axial movement of the guide arm in the receptacle is limited by the pin abutting against an end of the slot.

4. The assembly of claim 3, wherein the pin and the slot further define the pivot mechanism, such that when the pin abuts against the end of the slot, the guide arm can be pivoted relative to the lifting guide.

5. The assembly of claim 1, wherein the lifting guide defines a receptacle to receive the guide arm such that the guide arm can move axially therein.

6. The assembly of claim 1, wherein the lifting guide has openings formed therein, and wherein the guide arm comprises two resilient arm portions, wherein, in the closed position, the guide arm is located in the lifting guide such that the resilient arms protrude and secure against edges of the openings in the lifting guide to secure the guide arm in the lifting guide in the closed position.

7. The assembly of claim 6, wherein the guide arm is configured to be released from being secured in the lifting guide in the closed position by application of a pressing force on the resilient arms through the openings of the lifting guide, to allow the guide arm to move axially within the lifting guide.

8. The assembly of claim 1, wherein the closure cap is provided with a securing means to secure the closure cap in the open position.

9. The assembly of claim 8, wherein the securing means includes a magnet.

10. The assembly of claim 1, wherein the closure cap comprises a plug on an inner surface thereof configured to fit within the opening of the port, in use.

11. The assembly of claim 1, further comprising a seal on an inner surface of the closure cap.

12. A port assembly comprising:
    a fluid port having a fluid flow channel defined along an axis and a fluid opening at an end of the first fluid flow channel; and
    a closure assembly as claimed in claim 1, arranged such that the closure cap closes the opening in the closed position.

13. A port assembly as claimed in claim 12, wherein the port and the lifting guide are mounted to a common port assembly housing.

* * * * *